United States Patent
Yamada et al.

(10) Patent No.: US 8,250,331 B2
(45) Date of Patent: Aug. 21, 2012

(54) OPERATING SYSTEM VIRTUAL MEMORY MANAGEMENT FOR HARDWARE TRANSACTIONAL MEMORY

(75) Inventors: Koichi Yamada, Los Gatos, CA (US); Gad Sheaffer, Haifa (IL); Ali-Reza Adl-Tabatabai, San Jose, CA (US); Landy Wang, Kirkland, WA (US); Martin Taillefer, Redmond, WA (US); Arun Kishan, Bellevue, WA (US); David Callahan, Seattle, WA (US); Jan Gray, Bellevue, WA (US); Vadim Bassin, Raanana (IL)

(73) Assignee: Microsoft Corporation, Redmond, WA (US)

(*) Notice: Subject to any disclaimer, the term of this patent is extended or adjusted under 35 U.S.C. 154(b) by 493 days.

(21) Appl. No.: 12/493,161

(22) Filed: Jun. 26, 2009

(65) Prior Publication Data

US 2010/0332721 A1 Dec. 30, 2010

(51) Int. Cl.
| | |
|---|---|
| G06F 12/00 | (2006.01) |
| G06F 13/00 | (2006.01) |
| G06F 13/28 | (2006.01) |
| G06F 9/26 | (2006.01) |
| G06F 9/34 | (2006.01) |
| G06F 9/455 | (2006.01) |
| G06F 9/46 | (2006.01) |

(52) U.S. Cl. ........ 711/203; 711/202; 711/118; 711/141; 711/144; 711/145; 711/146; 711/147; 711/154; 718/101

(58) Field of Classification Search ........................ None
See application file for complete search history.

(56) References Cited

U.S. PATENT DOCUMENTS

| | | | |
|---|---|---|---|
| 5,394,555 | A | 2/1995 | Hunter |
| 5,404,555 | A | 4/1995 | Liu |
| 5,428,761 | A | 6/1995 | Herlihy et al. |
| 5,768,500 | A | 6/1998 | Agrawal |
| 5,835,764 | A * | 11/1998 | Platt et al. ...................... 718/101 |
| 6,314,563 | B1 | 11/2001 | Agensen |
| 6,665,704 | B1 | 12/2003 | Singh |
| 6,751,617 | B1 | 6/2004 | Anfindsen |
| 6,842,830 | B2 | 1/2005 | Khare |

(Continued)

OTHER PUBLICATIONS

U.S. Appl. No. 12/495,582, filed Jun. 30, 2009, Gray.

(Continued)

*Primary Examiner* — Sanjiv Shah
*Assistant Examiner* — Marwan Ayash
(74) *Attorney, Agent, or Firm* — Workman Nydegger

(57) ABSTRACT

Operating system virtual memory management for hardware transactional memory. A method may be performed in a computing environment where an application running on a first hardware thread has been in a hardware transaction, with transactional memory hardware state in cache entries correlated by memory hardware when data is read from or written to data cache entries. The data cache entries are correlated to physical addresses in a first physical page mapped from a first virtual page in a virtual memory page table. The method includes an operating system deciding to unmap the first virtual page. As a result, the operating system removes the mapping of the first virtual page to the first physical page from the virtual memory page table. As a result, the operating system performs an action to discard transactional memory hardware state for at least the first physical page. Embodiments may further suspend hardware transactions in kernel mode. Embodiments may further perform soft page fault handling without aborting a hardware transaction, resuming the hardware transaction upon return to user mode, and even successfully committing the hardware transaction.

7 Claims, 4 Drawing Sheets

U.S. PATENT DOCUMENTS

| | | | |
|---|---|---|---|
| 6,845,430 B2 | 1/2005 | Hopeman | |
| 6,862,635 B1 | 3/2005 | Alverson | |
| 6,871,264 B2 | 3/2005 | Soltis | |
| 6,898,609 B2 | 5/2005 | Kerwin | |
| 6,938,128 B1 | 8/2005 | Kuskin et al. | |
| 6,976,155 B2 | 12/2005 | Drysdale | |
| 7,111,294 B2 | 9/2006 | Steensgaard | |
| 7,127,561 B2 | 10/2006 | Hill | |
| 7,162,512 B1 | 1/2007 | Amit | |
| 7,181,578 B1 | 2/2007 | Guha | |
| 7,210,145 B2 | 4/2007 | Srinivasan | |
| 7,213,106 B1 | 5/2007 | Koster | |
| 7,246,123 B2 | 7/2007 | Carr | |
| 7,320,065 B2 | 1/2008 | Gosior | |
| 7,376,800 B1 | 5/2008 | Choquette | |
| 7,395,382 B1 * | 7/2008 | Moir | 711/147 |
| 7,406,698 B2 | 7/2008 | Richardson | |
| 7,467,323 B2 | 12/2008 | Fields | |
| 7,478,210 B2 | 1/2009 | Saha | |
| 7,502,897 B2 | 3/2009 | Hertzberg | |
| 7,512,636 B2 | 3/2009 | Verma | |
| 7,516,366 B2 | 4/2009 | Lev | |
| 7,584,232 B2 | 9/2009 | Guo | |
| 7,711,909 B1 | 5/2010 | Lev et al. | |
| 8,095,824 B2 | 1/2012 | Gray | |
| 2003/0188300 A1 | 10/2003 | Patrudu | |
| 2004/0243868 A1 | 12/2004 | Toll et al. | |
| 2005/0060495 A1 | 3/2005 | Pistoulet | |
| 2005/0246487 A1 | 11/2005 | Ergan | |
| 2006/0085591 A1 | 4/2006 | Kumar | |
| 2007/0143287 A1 | 6/2007 | Adl-tabatabai | |
| 2007/0143741 A1 | 6/2007 | Harris | |
| 2007/0156780 A1 | 7/2007 | Saha | |
| 2007/0156994 A1 | 7/2007 | Akkary | |
| 2007/0198792 A1 | 8/2007 | Dice | |
| 2007/0198979 A1 | 8/2007 | Dice | |
| 2007/0239943 A1 | 10/2007 | Dice | |
| 2007/0245099 A1 | 10/2007 | Gray | |
| 2007/0245128 A1 | 10/2007 | Gray | |
| 2007/0260608 A1 | 11/2007 | Hertzberg | |
| 2007/0260942 A1 | 11/2007 | Rajwar | |
| 2008/0021934 A1 | 1/2008 | Hudson | |
| 2008/0040551 A1 | 2/2008 | Gray | |
| 2008/0127035 A1 | 5/2008 | Lev | |
| 2008/0162886 A1 | 7/2008 | Saha | |
| 2008/0163220 A1 | 7/2008 | Wang | |
| 2008/0270745 A1 | 10/2008 | Saha | |
| 2009/0006407 A1 | 1/2009 | Magruder | |
| 2009/0006467 A1 | 1/2009 | Visscher | |
| 2009/0006751 A1 | 1/2009 | Taillefer | |
| 2009/0006767 A1 | 1/2009 | Saha | |
| 2009/0007119 A1 | 1/2009 | Blumrich | |
| 2009/0019231 A1 | 1/2009 | Cypher | |
| 2009/0063780 A1 | 3/2009 | Terechko | |
| 2009/0089520 A1 | 4/2009 | Saha | |
| 2009/0113443 A1 | 4/2009 | Heller, Jr. | |
| 2009/0172292 A1 | 7/2009 | Saha | |
| 2009/0172303 A1 | 7/2009 | Welc | |
| 2009/0172305 A1 | 7/2009 | Shpeisman | |
| 2009/0172306 A1 | 7/2009 | Nussbaum | |
| 2009/0172654 A1 | 7/2009 | Zhao | |
| 2009/0204969 A1 | 8/2009 | Abadi | |
| 2009/0235237 A1 | 9/2009 | Song et al. | |
| 2009/0235262 A1 | 9/2009 | Ceze et al. | |
| 2010/0131953 A1 | 5/2010 | Dice | |
| 2010/0162249 A1 | 6/2010 | Shpeisman | |
| 2010/0169382 A1 | 7/2010 | Sheaffer | |
| 2010/0169579 A1 | 7/2010 | Sheaffer | |
| 2010/0169580 A1 | 7/2010 | Sheaffer | |
| 2010/0229043 A1 | 9/2010 | Saha | |
| 2010/0325630 A1 | 12/2010 | Flood | |
| 2011/0145304 A1 | 6/2011 | Gray | |
| 2011/0145498 A1 | 6/2011 | Taillefer | |
| 2011/0145553 A1 | 6/2011 | Levanoni | |
| 2011/0145802 A1 | 6/2011 | Levanoni | |

OTHER PUBLICATIONS

Ananian; "Unbounded Transactional Memory"; 2009; pp. 1-12; http://supertech.csail.mit.edu/papers/xaction.ps.

Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.

Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.

Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.

Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.

Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.

Moravan; "Supporting Nested Transactional Memory in LogTM"; Oct. 21-25, 2006; pp. 1-12; http://www.cs.wisc.edu/multifacet/papers/asplos06_nested_logtm.pdf.

Author Unknown; "Extending Hardware Transactional Memory to Support Non-Busy Waiting and Non-Transactional Actions"; 2006; pp. 1-19; http://209.85.229.132/search?q=cache:-9KLSEk_CcIJ:www.cs.purdue.edu/homes/jv/events/TRANSACT/slides/zilles.pdf+non-transactional+instructions+and+and+abort&cd=3&hl=en&ct=clnk&gl=in.

Carlstrom; "The ATOMOΣ Transactional Programming Language"; Jun. 11-16, 2006; pp. 1-13; http://tcc.stanford.edu/publications/tcc_pldi2006.pdf.

Moss; "Open Nested Transactions"; Semantics and Support; 2006; pp. 1-8; http://www.cs.utah.edu/wmpi/2006/final-version/wmpi-posters-1-Moss.pdf.

Minh; "An Effective Hybrid Transactional Memory System with Strong Isolation Guarantees"; Jun. 9-13, 2007; pp. 1-12; http://tcc.stanford.edu/publications/tcc_isca2007.pdf.

Chong; "Scalable HMM based Inference Engine in LVCSR"; Mar. 31, 2009; 1 page; http://www.icsi.berkeley.edu/cgi-bin/events.pl?ID=000531.

Zeichick; "Massive Multi-Core Processors: The Gamer's Edge"; Oct. 4, 2007; pp. 1-2; http://developer.amd.com/documentation/articles/Pages/1042007177.aspx.

Vasantharam; "CSMP"; 2009; pp. 1-3; http://sourceforge.net/projects/mupisoft/.

Bracy; "Disintermediated Active Communication"—Nov. 9, 2006—pp. 1-4—http://ieeexplore.ieee.org/stamp/stamp.jsp?arnumber=04069172.

Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.

Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.

Lilja; "Cache Coherence in Large-Scale Shared Memory Multiprocessors: Issues and Comparisons"—Sep. 1993—pp. 1-43—http://www.arctic.umn.edu/papers/coherence-survery.pdf.

Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.

Papamarcos; "A Low-Overhead Coherence Solution for Multiprocessors with Private Cache Memories"—1984—pp. 348-354—http://www.csl.cornell.edu/courses/ece572/papamarcos.isca84.pdf.

Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.

Andrew; "A Dictionary of HTML META Tags"—Feb. 11, 2007—pp. 1-11—http://vancouver-webpages. com/META/metatags.detail.html.

Spear; "Implementing and Exploiting Inevitability in Software Transactional Memory"—2008—pp. 59-66—http://ieeexplore.ieee.org/stamp/jsp?arnumber=04625833.

Author Unknown; Wikipedia; "Software Transactional Memory"—May 7, 2009—pp. 1-7—http://en.wikipedia.org/wiki/Software_transactional_memory.

Chuang; "Unbounded Page-Based Transactional Memory"—Oct. 21-25, 2006—pp. 1-12—http://www.cse.ucsd.edu/~wchuang/ASPLOS-06-PTM.pdf.

Swift; "OS Support for Virtualizing Hardware Transactional Memory"—2008—pp. 1-10—http://www.cs.wisc.edu/multifacet/papers/transact08_tvm.pdf.

Shriraman; "Hardware Acceleration of Software Transactional Memory"—Dec. 2005—pp. 1-22—http://www.cs.rochester.edu/u/scott/papers/2005_TR887.pdf.

Office Action dated Dec. 12, 2011 cited in U.S. Appl. No. 12/493,165.

Notice of Allowance dated Nov. 28, 2011 cited in U.S. Appl. No. 12/493,163.

Office Action dated Oct. 4, 2011 cited in U.S. Appl. No. 12/495,582.

Zilles et al. "Extending Hardware Transactional Memory to Support Non-busy Waiting and Non-transactional Actions," Nov. 2006, pp. 1-10.

Joao; "Flexible Reference-Counting-Based Hardware Acceleration for Garbage Collection"—Published Jun. 20-24, 2009 pp. 1-11.

Grossman; "The Transactional Memory/Garbage Collection Analogy"—Published Oct. 21-25, 2007—pp. 1-12 n.

Adl-Tabatabai; "Unlocking Concurrency"—Published Dec./Jan. 2006-2007 pp. 25-33.

Carlstrom; "Executing Java Programs with Transactional Memory"—Published Mar. 26, 2007 pp. 1-32.

Diestelhorst—"Hardware Acceleration for lock-free data structures and software-transactional memory"—Published Aug. 14, 2008 pp. 1-8.

Harizopoulos—"Steps towards cache-resident transaction processing"—Published 2004 pp. 1-12.

Lie—"Hardware Support for Unbounded Transactional Memory"—Published May 7, 2004 pp. 1-111.

Saha—"Architectural Support for Software Transactional Memory"—Published 2006 pp. 1-12.

Volos—"NePaITM: Design and Implementation of Nested Parallelism for Transactional Memory"—Published 2009, pp. 1-25.

Rothermel—"Concurrency Control Issues in Nested Transactions"—Published 1992, pp. 1-36.

Author Unknown—".Net Framework 4 Beta 1 enabled to use Software Transactional Memory (STM.NET Version 1.0)"—Published Jul. 24, 2009; pp. 1-84.

Nyte—"Nesting Models in Software Transactional Memory"—Published Sep. 14, 2007; pp. 1-3.

Agrawal—"Nested parallelism in transactional memory"—Published 2008; pp. 163-174.

Bobba—"Performance Pathologies in Hardware Transactional Memory"—Published 2007; pp. 1-11.

Author Unknown—"Hw-breakpoint: shared debugging registers"—Published Sep. 16, 2009; pp. 1-3.

Scherer—"Contention Management in Dynamic Software Transactional Memory"—Published Apr. 2004; pp. 1-10.

Curnow—"An Embedded Processor Architecture with Extensive Support for SoC Debug"—Retrieved Jun. 11, 2010; pp. 1-5.

Office Action dated Jan. 20, 2012 U.S. Appl. No. 12/493,167.

Office Action dated Feb. 3, 2012 U.S. Appl. No. 12/493,164.

Office Action dated Mar. 29, 2012 U.S. Appl. No. 12/493,168.

Office Action dated Mar. 16, 2012 U.S. Appl. No. 12/493,162.

Notice of Allowance dated Mar. 14, 2012 U.S. Appl. No. 12/495,582.

Office Action dated Apr. 4, 2012 U.S. Appl. No. 12/638,929.

* cited by examiner

OPERATING SYSTEM VIRTUAL MEMORY MANAGEMENT FOR HARDWARE TRANSACTIONAL MEMORY

This application is related to U.S. patent application Ser. No. 12/493,167 filed, Jun. 26, 2009, and entitled "PERFORMING ESCAPE ACTIONS IN TRANSACTIONS", as well as U.S. application Ser. No. 12/493,163, filed Jun. 26, 2009, and entitled "WAIT LOSS SYNCHRONIZATION", as well as U.S. application Ser. No. 12/493,162, filed Jun. 26, 2009, and entitled "FLEXIBLE READ- AND WRITE-MONITORED AND BUFFERED MEMORY BLOCKS", as well as U.S. application Ser. No. 12/493,164, filed Jun. 26, 2009, and entitled "PRIVATE MEMORY REGIONS AND COHERENCE OPTIMIZATIONS", as well as U.S. application Ser. No. 12/493,168, filed Jun. 26, 2009, and entitled "MINIMIZING CODE DUPLICATION IN AN UNBOUNDED TRANSACTIONAL MEMORY", as well as U.S. application Ser. No. 12/493,165, filed Jun. 26, 2009, and entitled "METAPHYSICALLY ADDRESSED CACHE METADATA". All of the foregoing applications are being filed concurrently herewith and are incorporated herein by reference.

BACKGROUND

Background and Relevant Art

Modern multi-thread and multiprocessor computer systems have created a number of interesting challenges. One particular challenge relates to memory access. In particular, computer processing capabilities can be increased by using cache memory in addition to regular system memory. Cache memory is high speed memory coupled to a processor and often formed on the same die as the processor. Additionally, cache memory is much smaller than system memory and is made from higher speed memory components than system memory. As such, the processor can access data on the cache memory more quickly than from the regular system memory. Recently or often used data and/or instructions can be fetched from the system memory and stored at the cache memory where they can be reused so as to reduce the access to the slower regular system memory. Data is typically stored in a cache line of a fixed size (e.g. 64 B) where the cache line includes the data of interest and some other data logically surrounding the data of interest. This is useful because often there is a need to operate data related to the data of interest, and that data is often stored logically near the data of interest. Data in the cache can also be operated on and replaced.

As noted, cache memory is typically much smaller than system memory. As such, there is often a need to invalidate cache entries and replace them with other data from the system memory. When a cache entry is invalidated, the data in the cache will typically be sent back to system memory for more persistent storage, especially if the data has been changed. When only a single processor, running a single thread, and a single cache is in use, this can be performed in a relatively straight forward fashion.

However, in multi core systems or multi thread system, each core or thread often has its own local cache. Thus, the same data may be cached at several different locations. If an operation is performed on the data to change the data, then there should be some way to update or invalidate other caches of the data. Such endeavors typically are referred to in the context of cache coherence.

One method of accomplishing cache coherence is to use a coherence bus on which each cache can query other caches and/or can receive messages about other caches. Additionally, each cache line includes a tag entry which specifies a physical address for the data cached at the cache line and a MESI indicator. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache coherent multiprocessor, a level of data cache that is logically private to one processor (usually level one data cache (L1D$)) may be extended with additional MESI state and behavior to provide cache based data conflict detection and to locally buffer speculative writes in order to implement a hardware transactional memory system.

Additionally, to implement hardware transactional memory, processor instructions may be implemented to begin, commit, and abort transactions, and to implicitly or explicitly perform transactional load/stores. Often computing system implement transactional operations where for a given set of operations, either all of the operations should be performed or none of the operations are performed. For example, a banking system may have operations for crediting and debiting accounts. When operations are performed to exchange money from one account to another, serious problems can occur if the system is allowed to credit one account without debiting another account. However, transactional computing maintains historical information such that operations can be rolled back if all operations in an atomic set of operations cannot be performed. If all of the operations in the atomic set of operations have been performed, then any changes to data stored in memory are committed and become globally available to other actors for reading or for further operations. Transactional computing can be implemented, in some systems, using specialized hardware that supports transactional memory. In these systems, the MESI state of each cache line may reflect it represents a line that was transactionally read and/or written.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A method may be performed in a computing environment where an application running on a first hardware thread has been in a hardware transaction, such that read or write operations performed while in the transaction implicitly have transactional memory hardware state in cache entries correlated by memory hardware when data is read from or written to data cache entries. The data cache entries are correlated to physical addresses in a first physical page (PA1) mapped from a first virtual page (VA1) in a virtual memory page table. The method includes acts for invalidating transactional memory hardware state. The method includes an operating system deciding to unmap the first virtual page. As a result, the operating system removes the mapping of the first virtual page (VA1) to the first physical page (PA1) from the virtual memory page table. As a result, the operating system performs an action to discard transactional memory hardware state for at least the first physical page (PA1). Embodiments may further include functionality for suspending a hardware transaction when transitioning from user mode to kernel mode, and while in kernel mode performing page fault handling including soft page fault handling, and then returning back to user mode and resuming the hardware transaction and even successfully committing the hardware transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
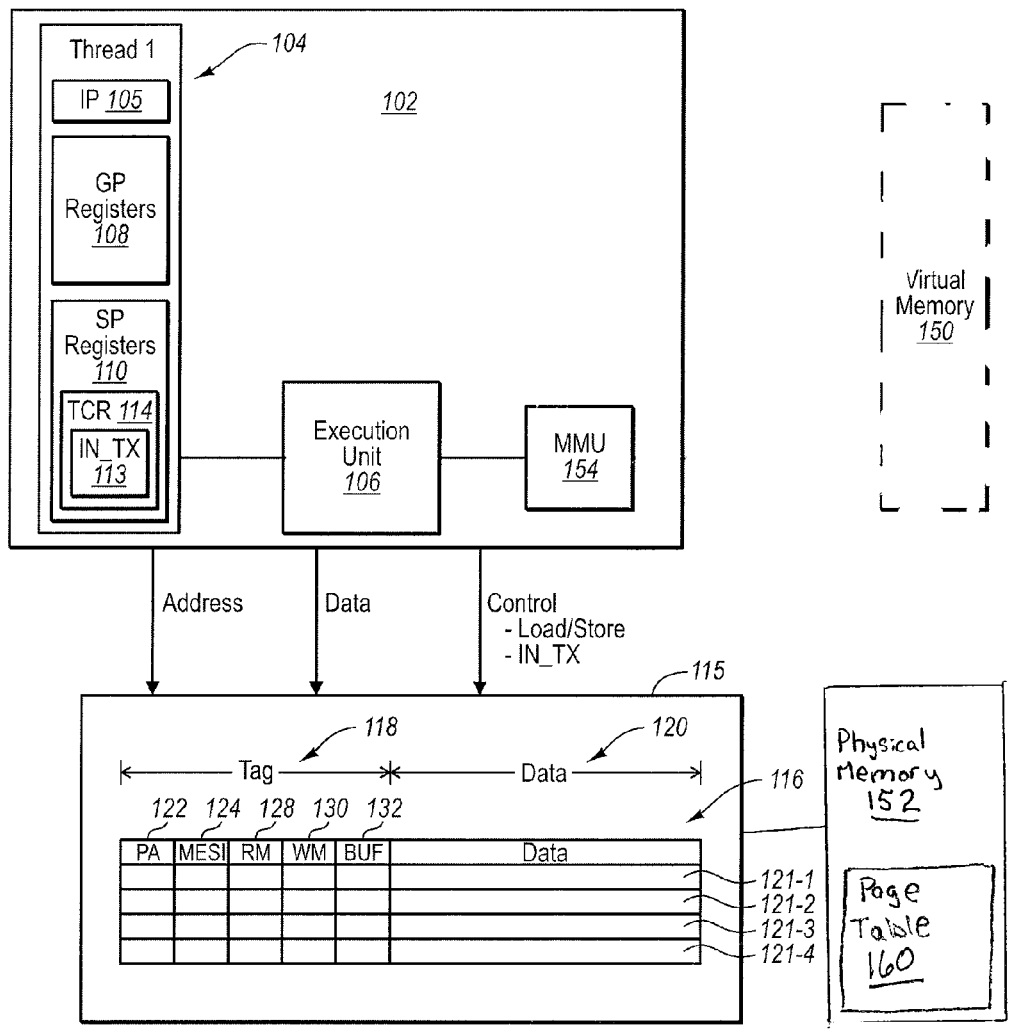
FIG. 1A illustrates a computing system with a cache hierarchy.

Some embodiments described herein implement an extension of baseline hardware transactional memory (HTM). Some embodiments include the ability to, per hardware thread, for a particular thread, using software and a processor instruction set architecture interface, set and test access monitoring indicators to determine if blocks of memory in a cache hierarchy are accessed by different hardware threads. For example, software instructions can be used to set a read monitor indicator for a block of cache memory for a particular hardware thread. If another hardware thread writes to the memory block, the read monitor indicator is reset and the event is accrued using a status register. Similarly, software instructions can be used to set a write monitor indicator for a block of cache memory for a particular hardware thread. If another hardware thread reads or writes to the memory block, the write monitor indicator is reset and the event is accrued using a status register.

Additionally or alternatively, some embodiments allow metadata about data to be stored at the same physical address as the data, but in a metadata address space different from a data address space that stores the data corresponding to the metadata. This can have the advantage of being able to eliminate expensive correlation tables and pointers needed to correlate data at one address to its corresponding metadata at a different address. Rather, to access metadata, an access metadata instruction (e.g. load metadata or store metadata), instead of a conventional data access instruction, is issued for the same address for the corresponding data. In particular, processor hardware may differ from conventional processor hardware by including a specialized instruction set architecture which includes specialized instructions for handling or accessing metadata. These specialized instructions may interact with specialized cache state machines and logic to make specialized accesses that make entries to store metadata in a cache where the same cache may also store the underlying data.

As noted, embodiments may be implemented by using a data cache. In particular, a data cache allows a copy of data from a physical address location of system memory to be stored locally (e.g. local to a die, a processor, or a thread) in memory accessed faster than system memory, such as system virtual and/or physical memory, and to be assigned the physical address in the cache. This can be leveraged to allow cache to store metadata for data at the same address as the data by using specialized metadata access instructions. In particular, the ability to have several different storage devices that can have the same address facilitates the ability to store different data at the same physical address. Storing metadata at the same address as the corresponding data may be referred to herein as metaphysically addressing metadata.

With buffering, monitoring and metadata properties (collectively "transactional memory hardware state" or "HTM state") described above implemented by hardware using cache memory, the new hardware based transactional memory embodiments may use algorithms and software implementations to accelerate the performance of the transactions as compared to a software only solution if the embodiments can effectively avoid and minimize the transaction abort incidents. These incidents are a major cause of the performance degradation in hardware accelerated transaction systems. Aborting the transaction is expensive in that it requires the hardware runtime system to roll back all the executed operations in this transaction and restart the transaction from the beginning possibly with a different less aggressive transaction scheme to avoid repeated aborts.

Embodiments may include the ability to perform a discard transactional memory hardware state operation where the buffering, monitoring and metadata properties and/or associated are discarded from cache. This discard operation may be a cause of the transaction aborts. A discard operation may occur when the operating system performs demand paged virtual memory management operations for the memory system of a computing system. As the systems described herein may be, in some embodiments, aimed to support arbitrarily large transactions in time and memory footprint, embodiments may be implemented to reduce the occurrences of the property discard operation associated with virtual memory management operations to yield desired performance results through the hardware accelerations.

As such, some embodiments reduce the occurrences of the property discard operation during the hardware accelerated transaction by implementing one or more of a new operating system memory manager algorithm to defer discarding properties until a page repurpose point, hardware support for invalidating properties (such as buffering, monitoring, or metadata properties) for an individual page on all processors on a system; or hardware support for allowing the operating system to perform page fault handling including soft page fault handling without aborting hardware transactional memory threads.

Setting and Testing Monitoring and Buffering

FIG. 1A illustrates transaction capable hardware that may be used to perform transactional computing. FIG. 1A illustrates a processor 102. The processor 102 includes a thread state 104. The thread state 104 includes a number of registers, including an instruction pointer register 105 that points to a memory location of a next instruction to be executed by the thread 104 (and more specifically by the execution unit 106), a set of general purpose registers 108, and a set of special purpose registers 110. In the presently illustrated embodiment, the special purpose registers 110 include a transaction control register 112. The transaction control register 112 includes a number of indicators specifying whether or not operations are being performed within the context of a transaction, and what action should occur when prohibited operations take place within the context of a transaction. For example a transaction control register TCR 112 may have an indicator 1N_TX 113 that specifies that operations take place within a transaction and receive transactional memory semantics. Coupled to the processor 102 is a cache memory 115. In this example the cache memory 115 is a level one data cache (L1D$). The cache 115 includes a cache state 116. The cache state 116 is divided into two portions, namely a cache tag portion 118 and a cache data portion 120. The cache state 116 includes a number of cache lines 121.

The tag column 118 typically includes an address column 122 and a MESI column 124. The address column 122 includes a physical address for data stored in the data column 120. In particular, a computing system generally includes system memory. The system memory may be, for example semiconductor based memory, one or more hard-drives and/or flash drives. The system memory has virtual and physical addresses where data is stored. In particular, a physical address identifies some memory location in physical memory 152, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not to provide a thread private buffer for speculative writes during an HTM transaction.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture as will be demonstrated in further detail below.

Illustrating now further functionality of the transaction control register 112 with respect to the cache state 116, if a memory access e.g. a load or store operation is performed while the transaction control register 112 indicates that the thread 104 is within the scope of a transaction (e.g. TCR.IN_TX=1), memory access monitoring state can be represented and indicated in the monitoring entries 128 and/or 130 of a cache line 121. For example, if a load operation is being performed within the context of the transaction, it may be desirable to set a read monitor (e.g. by setting a bit in the RM column 128 for the cache line 121) on the data and on a cache line used to perform the load operation. The read monitor indicates whether or not a block of data in the data column 120 should be monitored to determine if the data in the data column 120 is written to by another thread. In another example, if a store operation is being performed within the context of a transaction, a write monitor and a buffer indication may be placed in the monitor and buffer entries 130 and 132 respectively of a cache line 121. The write monitor indicates whether or not the block of data in the data column 120 should be monitored to determine if the data in the data column is read by or written to by another thread. The buffer indicator indicates that the cache is buffered and that the buffered block of data is not globally observed by other agents. This allows the cache line 121 to be used as a thread private temporary storage location for performing operations and/or for storing data that must be rolled back in the event that a transaction is aborted.

Figure 1B:
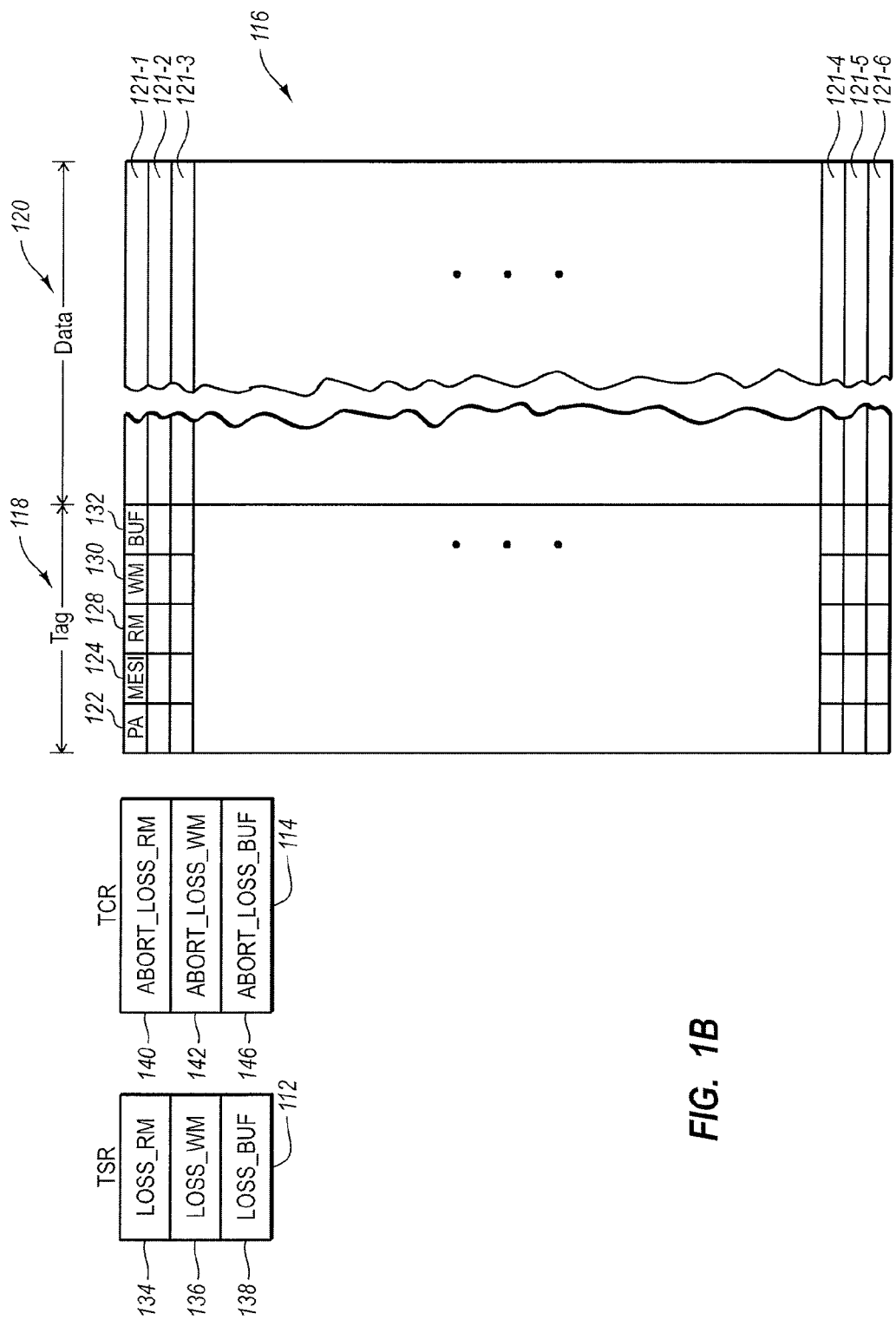
FIG. 1B illustrates details of a data cache with memory access monitoring enabled

FIG. 1B further illustrates details of the transaction status register 112 included in the hardware threads 104. The transaction status register 112 accumulates events related to the read monitor indicator, the write monitor indicator, and the buffering indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

Additional details of some embodiments can be found in U.S. patent application Ser. No. 12/493,162, titled "Flexible Read- And Write-Monitored And Buffered Memory Blocks" file concurrently herewith and incorporated by reference herein in its entirety.

Metaphysically Addressed Cache Metadata

Some embodiments allow metadata about data to be stored and loaded at the same physical address as the data, but in a metadata address space different from a data address space that stores the data corresponding to the metadata. This can have the advantage of being able to eliminate expensive mapping tables and pointers needed to correlate data at one address to its corresponding metadata at a different address. Rather, to access metadata, an access metadata instruction (e.g. load metadata or store metadata), instead of a conventional data access instruction, is issued for the same address for the corresponding data. In particular, processor hardware may differ from conventional processor hardware by including a specialized instruction set architecture which includes specialized instructions for accessing or managing metadata. These specialized instructions may interact with specialized cache state machines and logic to make specialized accesses that make entries to store metadata in a cache where the same cache may also store the underlying data.

As noted, embodiments may be implemented by using a data cache. In particular, a data cache allows a copy of data from a physical address location of system memory to be stored locally (e.g. local to a die, a processor, or a thread) in memory accessed faster than system memory, such as system virtual and/or physical memory, and to be assigned the physical address in the cache. This can be leveraged to allow cache to store metadata for data at the same address as the data by using specialized metadata access instructions. In particular, the ability to have several different storage devices that can have the same address facilitates the ability to store and retrieve different data at the same physical address. Storing metadata at the same address as the corresponding data may be referred to herein as metaphysically addressing metadata.

Details of such embodiments are described more fully in U.S. patent application Ser. No. 12/493,165, titled "Metaphysically Addressed Cache Metadata" filed concurrently herewith, and which is incorporated by reference herein in its entirety.

Invalidating Properties for a Given Page on all Processors in a Coherence Domain Referring once again to FIG. 1A, as noted, embodiments described herein may use memory hierarchies which include virtual memory 150. Applications generally access data using virtual memory addresses. When virtual memory is used, the virtual memory 150 generally appears to the application as an expanse of possibly discontiguous addresses. However, in reality, data stored in virtual memory 150 may be scattered about in unrelated pages of physical system memory RAM, as well as in different storage locations such as mass storage device like hard drives, flash drives, and the like. Thus, when software is used to execute a load or store operation, a processor 102 executes an instruction at an execution unit 106 using the virtual address. The virtual address is passed to a memory management unit 154 which includes tables which map virtual memory addresses to physical memory addresses of the physical memory 152. When caching data, data is cached in the L1D$ 115 using physical addresses. (In other embodiments cache data may be indexed and/or tagged with virtual addresses.) In particular, an address entry 122 in a cache line 121 includes the physical address (or at least a portion of the physical address) as used by the physical memory 152 for addressing the data.

Returning once again to the discussion of the physical memory 152 and the virtual memory 150, data can be moved from virtual memory 150 to physical memory 152, such as system RAM. However, not all of the data in the virtual memory 150 may necessarily fit into the physical memory 152. Therefore, the virtual memory is divided into pages, where a page is generally a block of contiguous virtual addresses, such as for example a 4 Kbyte range of addresses. Thus, the memory mapping unit typically includes page tables or consults page tables elsewhere in RAM which contain page table entries which map pages of virtual memory to pages of physical memory.

It is often necessary to repurpose physical pages from the set of physical pages committed for the current virtual to physical page mappings to make room for additional data from the virtual memory 150. When needed, data that was previously removed from the physical memory can be reloaded by reloading an appropriate page from the virtual memory, or the file system, or from scratch as in the case of demand zero filled pages. When a page in the physical memory 152 for a page of virtual memory 150 is removed and then later reloaded, it is usually the case that the page is used by a different virtual address page than when loaded in a previous instance. As such, the virtual memory page table 160 and the memory management unit 154 are updated with new mappings to map a new virtual address to the physical address. However, as noted previously, transactional memory hardware state, such as metadata (possibly stored in a data entry 120 of a cache line 121) and buffering indicators and monitoring indicators (possible stored in a buffering or monitoring indicators 128, 130 and/or 132) are tied to a physical address in an address entry 122 in the L1D$ 115. Because the application communicates using virtual addresses, once a page is removed from the physical memory, the physical address in the L1D$ 115 no longer corresponds to the proper virtual address. If the properties for the repurposed physical page are permitted to remain intact, its presence can cause various correctness and security problems as this new state may be accessed through a different virtual address. Thus, embodiments may include functionality for performing a property discard operation to discard properties for any cache lines in any caches correlated to the physical addresses in the repurposed physical page frame.

A property discard operation can be provided through a new software instruction in an instruction set architecture or software access via memory and/or a register. In particular, in one embodiment, a new instruction discards transactional memory hardware state such as buffered data, cached metadata and/or clears all monitoring on all monitoring blocks that span the same pages as a given target memory location specified as a parameter of the instruction on all processors in a transactional memory coherency domain for all cache memories, such as L1D$ 114. Additionally, the instruction may generate or cause appropriate read monitoring loss, write monitoring loss or buffering loss events (which can be accrued, for example at 134, 136 and 138 respectively in the transaction status register 112 illustrated in FIG. 1B) if any of the associated properties were previously set within the target page specified as a parameter in the property discard operation instruction. This can cause transactions to be aborted as appropriate or can cause other error handling to be accomplished. In the examples herein, an example instruction illustrating the property discard operation is referred to as the TINVDPGA instruction which includes functionality to invalidate monitoring and buffering for a page with and accumulate property loss events in the TSR. In one embodiment when the intent of the TINVDPGA instruction is to invalidate the transactional memory properties including, monitors, buffers and/or metadata, of the specified physical address page, it can be implemented through leveraging the existing cache protocol to broadcast new transactional memory property invalidate requests across the cache coherence interconnect to all processors and caches. In particular, as noted above, the MESI protocol can be used to invalidate cache entries. As such, an extension of such a protocol may allow for messages to be sent to invalidate transactional memory hardware state at a page granularity for a given physical page or physical address. Alternatively, an instruction may be used on a per-processor basis to invalidate monitoring, transactional memory hardware state such as buffering and/or metadata properties. Alternatively, an instruction may be used to invalidate all transactional memory hardware state across all caches and related processors in a computing system. In using the TINVDPGA, the cache protocol may be, in some embodiments, enhanced to not only invalidate the cache lines but also discard new transactional memory properties associated with the given cache lines. When done through hardware broadcast, this has performance advantages over corresponding software mechanism, reducing the total latencies and coherence traffic required to discard the new transactional memory properties on the current and remote processors.

As noted, one cause of the transaction aborts is the property discard operation. A property discard operation occurs when the operating system performs memory management operations. As the new transactional memory may include embodiments aimed to support arbitrarily large transactions in time and memory footprint, some embodiments implement functionality to reduce the occurrences of the property discard operation associated with virtual memory management operations to yield desired performance results through the hardware accelerations.

To reduce the occurrences of the property discard operation, a new operating system memory manager method can be used to defer discarding properties until a physical page repurpose point.

To minimize the occurrence of the new transactional memory property discard operations by the operating system, some embodiments implement the new memory manager algorithm. Rather than performing the new transactional memory property discard operation at the point of unmapping the physical page from its virtual to physical page mapping, the new transactional memory property discard operation can be deferred until the physical page repurpose point as the page is about to be the target of a new virtual to physical page mapping for a different virtual address page. Many virtual memory algorithms in modern operating system implement the page fault algorithm called soft page faults that allows the operating system to reuse the previously mapped physical page by reestablishing the previous virtual to physical page mapping for this faulting virtual address as long as the physical page has not already been repurposed as the target of a different virtual address mapping.

As the new transactional memory property discard operation is needed only when virtual to physical mapping for the page is finally established, embodiments may implement a special memory manager algorithm to defer the new transactional memory property operation for a given page is until the page repurpose point. This contributes to reducing the occurrences of the property discard operation and improves the chances that a hardware transaction that may use HTM properties correlated with the physical page may successfully complete and commit. When the physical page needs to be repurposed, the new memory manager algorithm uses the property discard operation instruction (e.g. the TINVDPGA instruction) to discard one or more of the new transactional memory properties (e.g. monitoring indicators, buffering indicators, and/or metadata) from all processors on a system. However, embodiments may also be implemented to perform property discard operations as soon as possible. For example, property discard operations may be performed as soon as possible after a processor decides to unmap mapping from a virtual page to a physical page.

Some embodiments include functionality which allows the operating system to perform soft page faults without causing transaction abort and enables some embodiments of the transactional memory manager algorithms for new transactional memory threads described above. Otherwise soft page faults may result in aborting transactions and there would be no benefit of deferring the new transactional memory property discard operations from the point of unmapping the virtual page to the page repurpose point. However, sojourns into the kernel while a thread is executing a hardware transaction, such as required to service page faults including soft page faults requires ways to suspend the hardware transaction while the processor is operating in kernel mode, such as the operating system mode at ring 0 of some processor architectures, while continuing to perform memory access conflict detection monitoring—in case other agents perform conflicting accesses to shared memory while this thread is in the kernel—and thereby tracking loss of new transactional memory properties and recording and accumulating such new transactional memory property loss event information. In one embodiment, an instance of a hardware implementation of transactional memory provides a way to suspend the transaction based on the state of current privilege level. For example, in one embodiment, hardware may suspend transactions when the processor is not in user mode, sometime referred to as ring 3 on some processor architectures. In particular, no new state tracking (e.g. setting RM 128, WM 130 or BUF 132 entries for cache lines 121) will be implicitly established for memory access operations performed while in kernel mode, whereas new state tracking (e.g. setting RM 128, WM 130 or BUF 132 entries for cache lines 121) will implicitly be established for memory access operations performed while in user mode. However, hardware continues to perform memory access conflict detection monitoring for cache lines that already have RM or WM monitoring established, and recording and accumulating any loss events of new transactional memory properties can be implemented and provided through a hardware status register (e.g. TSR 112) whether in user mode or in kernel mode.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
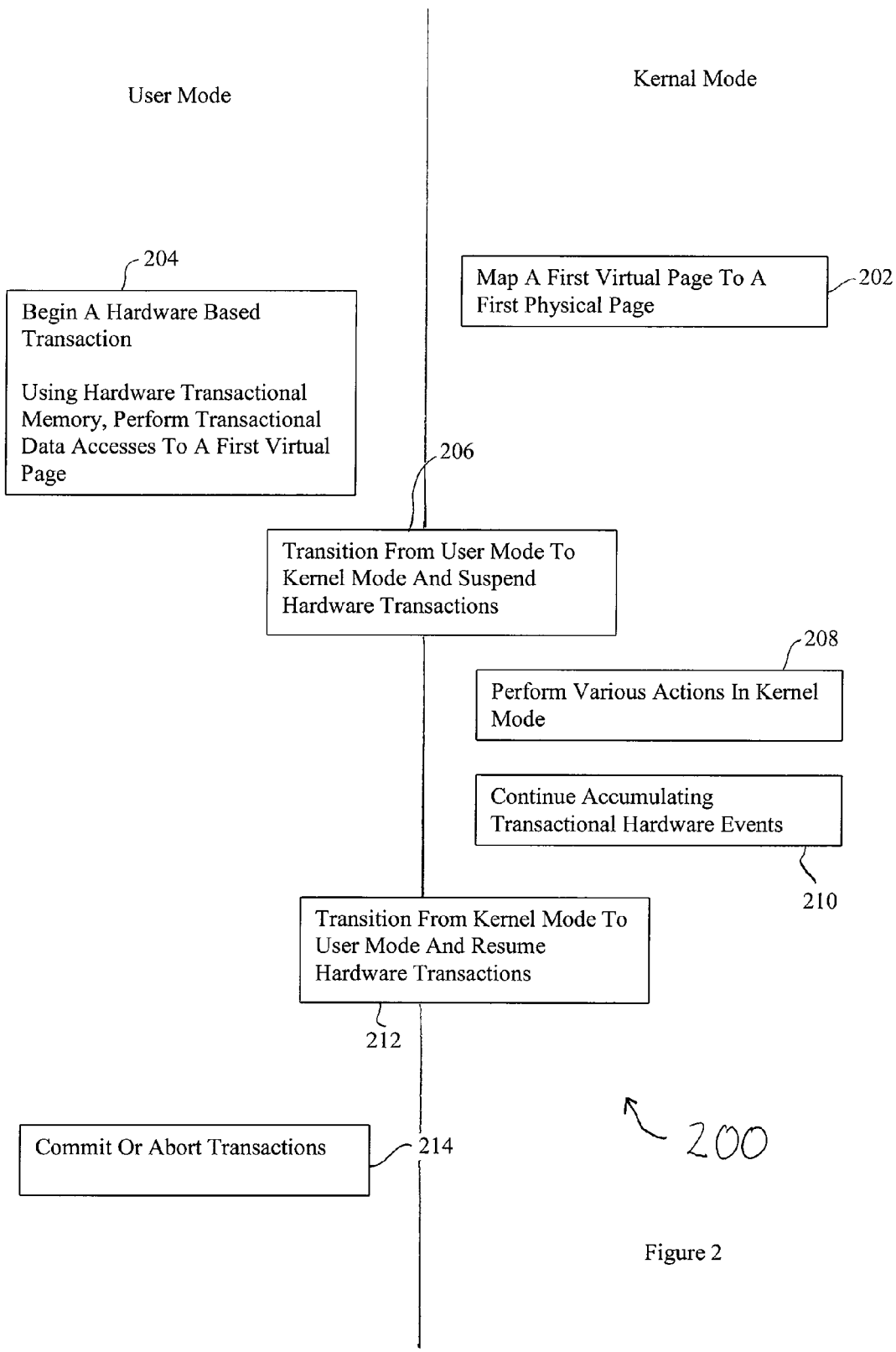
FIG. 2 illustrates a method of suspending hardware transactions for sojourns into the operating system kernel.

Referring now to FIG. 2 various acts that may be performed in one method are illustrated. At a first hardware thread (T1), an operating system in kernel mode allocates a first virtual page (VA1) causing the first virtual page to be mapped to a first physical page (PA1) in a virtual memory page table (act 202).

An application running on the first hardware thread (T1) begins a hardware transaction (act 204), such that read or write operations performed while in the transaction implicitly establish transactional memory hardware state when data is read from or written to data cache entries. For example, with reference to FIG. 1A RM, WM, and/or BUF entries 128, 130, and/or 132 may be implicitly set on cached reads or writes 115 when the IN_TX register 113 is asserted. The data cache entries are correlated to physical addresses in the first physical page (PA1). FIG. 1A illustrates an example where PA entries 122 are appropriately correlated to cache lines 121.

The first hardware thread (T1) performing a user to kernel mode transition (act 206). As a result of the first hardware thread (T1) performing a user to kernel mode transition, the transactional memory hardware automatically suspends implicitly establishing transactional memory hardware state in cache entries when data is read or written to cache entries for the first thread (T1). For example, when various actions are performed in kernel mode (acts 208) which result in memory reads and writes, these accesses will not automatically establish RM, WM, and/or BUF entries 128, 130, and/or 132. In one embodiment, this may be facilitated by deasserting the IN_TX register 113 or by gating it with the user/kernel indicator or a threshold comparison of the current privilege level.

However, in some embodiments, hardware continues to perform memory access conflict detection monitoring for cache lines that already have RM or WM monitoring established and may continue to accumulate property loss events, such as loss of read or write monitoring or buffering events, for data which already have already had transactional hardware state applied (act 210). In particular, if RM, WM, and/or BUF entries 128, 130, and/or 132 are already set for cache lines 121 and a conflicting memory access from another agent occurs, even while the hardware thread is operating in kernel mode, loss events can be accumulated in the transaction status register 112 at 134, 136 or 138 as appropriate.

Then, the first hardware thread (T1) performs a kernel to user mode transition back to user mode (act 212). As a result of the first hardware thread (T1) performing a kernel to user mode transition, the transactional memory hardware automatically resumes implicitly establishing transactional memory hardware state in cache entries when data is read or written to cache entries for the first thread (T1). In one embodiment, this resumption may be accomplished by reasserting the IN_TX register 113 or by gating it with the user/kernel indicator or a threshold comparison of the current privilege level.

As noted, embodiments may be performed where the transactional memory hardware state is not automatically flushed as a result of the first hardware thread (T1) performing a user to kernel mode transition (act 206), the first hardware thread (T1) performing a kernel to user mode transition back to user mode (act 212), or the execution of instructions (e.g. act 208) while in kernel mode. For example, existing RM, WM, and/or BUF entries 128, 130, and/or 132 are not flushed from the cache 115 for these acts alone without something further, such as an action to discard transactional memory hardware state or a conflicting access.

The transactional memory hardware state may include at least one of memory access conflict monitoring, buffering or metadata properties in cache entries.

The method 200 may be performed where as a result of resuming implicit establishment of transactional memory hardware state in cache entries when data is read or written to cache entries for the first thread (T1), the first thread resumes the hardware transaction without incurring a transaction abort and then completes the transaction, including committing buffered write data for one or more buffered cache entries in the first physical page (PA1) (e.g. act 214). For example, entries in cache lines 121 that were buffered can be made globally visible to other agents in the system.

The method 200 may be performed where the first hardware thread (T1) performing a user to kernel mode transition being performed as the result of the operating system deciding to unmap the first virtual page which maps to the first physical page, and as a result, the operating system removing the mapping of the first virtual page (VA1) to the first physical page (PA1) from the virtual memory page table and performing actions to reload virtual memory management hardware with an updated mapping. For example the operating system may perform a translation look-aside buffer shootdown for the first virtual page (VA1). In the application, the first thread (T1) accesses a virtual addresses within the first virtual page (VA1), which generates a page fault. The page fault incurs the user to kernel mode transition. In one embodiment, the operating system that decides to unmap the first virtual page may be running on the same or a different thread than the first thread (T1).

Even though the operating system has decided to unmap the first virtual page which maps to the first physical page, in a kernel page fault handler, the operating system may discover that the previously mapped first physical page (PA1) has not yet been repurposed to a different virtual page than the first virtual page (VA1). As a result, the operating system may reestablish the virtual memory mapping from the first virtual page (VA1) to the first physical page (PA1) and perform actions to reload virtual memory management hardware with an updated mapping for the first virtual page (VA 1), and return from the page fault to resume execution of the first thread (T1).

The method 200 may be performed where the first hardware thread (T1) performing a user to kernel mode transition is performed as the result of a processor interrupt. Alternatively, the method 200 may be performed where the first hardware thread (T1) performing a user to kernel mode transition is performed as the result of an exception. Alternatively, the method 200 may be performed where the first hardware thread (T1) performing a user to kernel mode transition is performed as the result of a system call from the application running on the first hardware thread.

The method 200 may further include, while in kernel mode the transactional memory hardware continuing to monitor for conflicting memory accesses by other agents as illustrated at act 210. When an access occurs which conflicts, an indicator is set, such as for example, an indicator in the transaction status register 112 at 134, 136 or 138 as appropriate. Upon returning to user mode, and as a result of the indicator being set, the transaction is aborted (as illustrated at act 214).

In another example, a method may be performed in a computing environment where an application running on a first hardware thread has been in a hardware transaction, such that read or write operations performed while in the transaction implicitly have transactional memory hardware state in cache entries correlated by memory hardware when data is read from or written to data cache entries. The data cache entries are correlated to physical addresses in a first physical page (PA1) mapped from a first virtual page (VA1) in a virtual memory page table. The method includes acts for invalidating transactional memory hardware state. The method includes an operating system deciding to unmap the first virtual page. As a result, the operating system removes the mapping of the first virtual page (VA1) to the first physical page (PA1) from the virtual memory page table. For example, the operating system may update a page table entry in memory for the specific VA1 to PA1 mapping and then perform a TLB shootdown for the first virtual page (VA1). As a result, the operating system performs an action to discard transactional memory hardware state for at least the first physical page (PA1).

This method may be performed where the operating system performs an action to discard transactional memory hardware state for the first physical page as late as possible by performing the action to discard transactional memory hardware state for the first physical page when the first physical page is repurposed for another virtual page (VA2).

This method may be performed where the operating system performs an action to discard transactional memory hardware state for the first physical page as soon as possible after the operating system decides to unmap the first virtual page.

In one embodiment, the operating system performing an action to discard transactional memory hardware state for the first physical page is performed by executing a processor level instruction, such as an instruction similar to the TINVDPGA instruction described above, included in a processor instruction set architecture. The instruction is configured to discard transactional memory hardware state at a page granularity. Instructions may also be provided and executed to discard all transactional memory hardware state for a hardware thread or even across all agents and across an entire memory system.

The method may be performed where the operating system performing an action to discard transactional memory hardware state for the first physical page (PA1) includes the operating system performing an action to discard transactional memory hardware state for the first physical page (PA1) on a per processor basis, such that each processor in a multiprocessor system executes a processor level instruction included in a processor instruction set architecture. The instruction is configured to discard transactional memory hardware state at a page granularity for the processor.

The method may be performed where the operating system performing an action to discard transactional memory hardware state for the first physical page (PA1) includes the operating system performing an action to discard transactional memory hardware state for the first physical page (PA1) on a multiprocessor basis such that discarding transactional memory hardware state at a page granularity is performed for a plurality of processors using a single action.

The method may be performed where the operating system performing an action to discard transactional memory hardware state for the first physical page (PA1) is performed using a cache coherence system.

Figure 3:
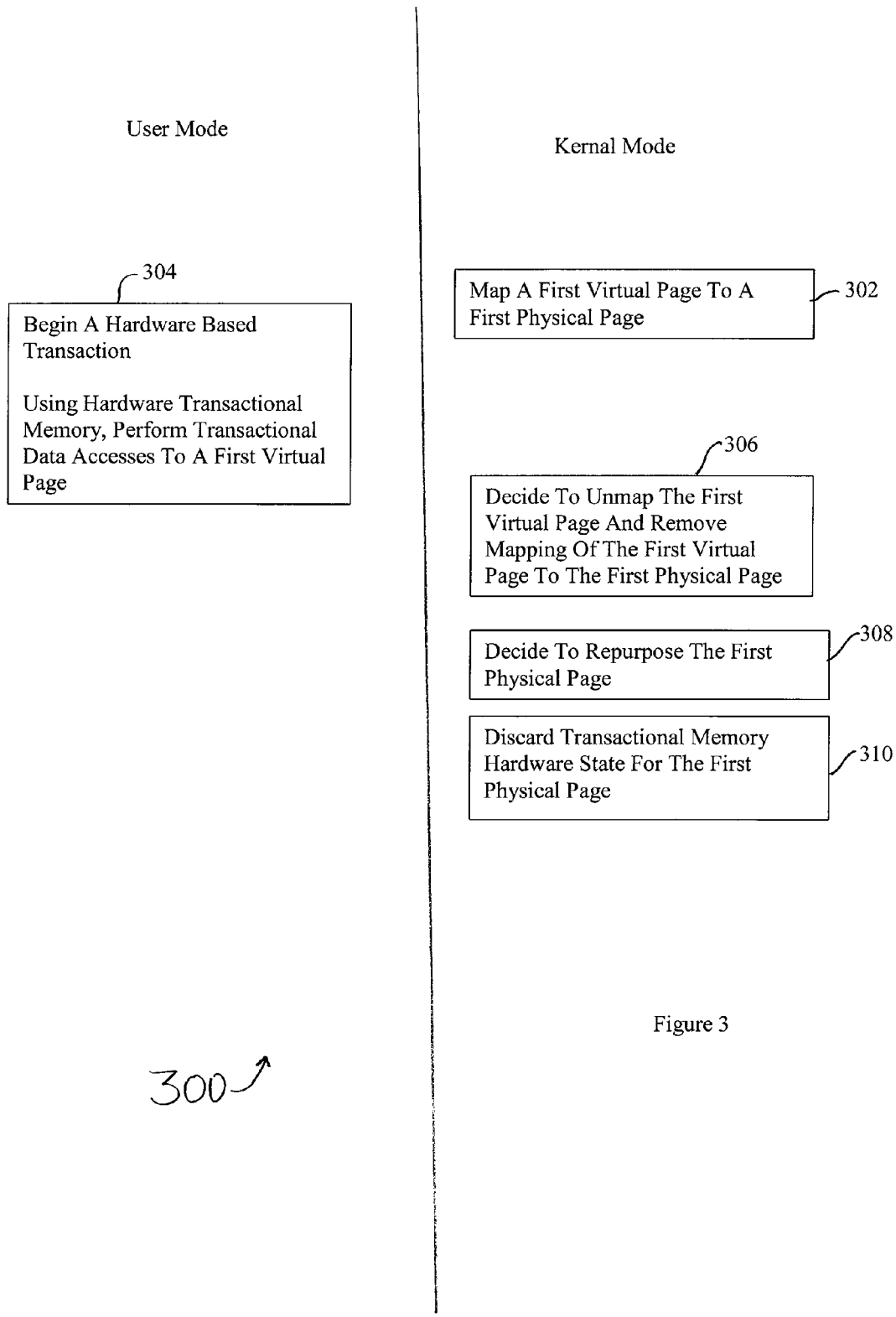
FIG. 3 illustrates a method of repurposing page mapping.

A method 300 is illustrated in FIG. 3. The method 300 includes at a first hardware thread (T1), an operating system in kernel mode allocating a first virtual page (VA1) causing the first virtual page to be mapped to a first physical page (PA1) in a virtual memory page table (act 302).

An application running on the first hardware thread (T1) begins a hardware transaction (act 304), such that read or write operations performed while in the transaction implicitly have transactional memory hardware state established when data is read from or written to data cache entries. The data cache entries are correlated to physical addresses in the first physical page (PA1).

The operating system decides to unmap the first virtual page, for example in a trimming operation, where the first virtual page maps to the first physical page, the first physical page containing transactional memory hardware state created by the first thread (T1), and as a result, the operating system removes the mapping of the first virtual page (VA 1) to the first physical page (PA1) from the virtual memory page table (act 306) and performs actions to reload virtual memory management hardware with an updated mapping for the first virtual page (VA1).

The application running on the first thread (T1) no longer accesses virtual addresses within first virtual page (VA1) for a period of time. As a result of the first thread (T1) no longer accessing virtual addresses within first virtual page (VA1) for a period of time, the operating system decides to repurpose the first physical page (PA1) for a different virtual page (VA2) (act 308).

As a result of the operating system deciding to repurpose the first physical page (PA1) for a different virtual page (VA2), the operating system performs an action to discard transactional memory hardware state for the first physical page (PA1) (act 310).

The method 300 may further include, as a result of the operating system performing an action to discard transactional memory hardware state for the first physical page (PA1), and where for one agent, the transactional memory hardware state was correlated to the first physical page, setting an indicator indicating that transactional memory hardware state was lost (e.g. setting 134, 136, or 138 depending on whether 128, 130, or 132 was lost respectively). As a result of the indicator being set, and being in user mode, the transaction is aborted.

The method 300 may further include the operating system mapping a different virtual page (VA2) to the first physical page (PA1).

In one embodiment, the operating system performing an action to discard transactional memory hardware state for the first physical page is performed by executing a processor level instruction, such as an instruction similar to the TINVDPGA instruction described above, included in a processor instruction set architecture. The instruction is configured to discard transactional memory hardware state at a page granularity. Instructions may also be provided and executed to discard all transactional memory hardware state for a hardware thread or even across all agents and across an entire memory system.

The method 300 may be performed where the operating system performing an action to discard transactional memory hardware state for the first physical page (PA1) includes the operating system performing an action to discard transactional memory hardware state for the first physical page (PA1) on a per processor basis, such that each processor in a multi processor system executes a processor level instruction included in a processor instruction set architecture. The instruction is configured to discard transactional memory hardware state at a page granularity for the processor.

The method 300 may be performed where the operating system performing an action to discard transactional memory hardware state for the first physical page (PA1) includes the operating system performing an action to discard transactional memory hardware state for the first physical page (PA1) on a multiprocessor basis such that discarding transactional memory hardware state at a page granularity is performed for a plurality of processors using a single action.

The method 300 may be performed where the operating system performing an action to discard transactional memory hardware state for the first physical page (PA1) is performed using a cache coherence system, such as for example, an extension of the MESI protocol system.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

at a first hardware thread, an operating system in kernel mode allocating a first virtual page causing the first virtual page to be mapped to a first physical page in a virtual memory page table;

an application running on the first hardware thread beginning a hardware transaction, such that read or write operations performed while in the transaction implicitly have transactional memory hardware state established when data is read from or written to data cache entries, wherein the data cache entries are correlated to physical addresses in the first physical page, and in the application, the first thread accessing a virtual address within the first virtual page which generates a page fault;

the first hardware thread performing a user to kernel mode transition caused by the page fault incurring the user to kernel mode transition;

as a result of the first hardware thread performing a user to kernel mode transition, the transactional memory hardware automatically suspending implicitly correlating transactional memory hardware state in cache entries when data is read or written to cache entries for the first thread;

then the first hardware thread performing a kernel to user mode transition back to user mode;

as a result of the first hardware thread performing a kernel to user mode transition, the transactional memory hardware automatically resuming implicit correlating of transactional memory hardware state in cache entries when data is read or written to cache entries for the first thread; and wherein the transactional memory hardware state is not automatically flushed as a result of the first hardware thread performing a user to kernel mode transition, the first hardware thread performing a kernel to user mode transition back to user mode, or the execution of instructions while in kernel mode.

2. The method of claim 1, wherein the transactional memory hardware state comprises at least one of memory access conflict monitoring, buffering or metadata properties in cache entries.

3. The method of claim 1, wherein as a result of resuming implicit correlating of transactional memory hardware state in cache entries when data is read or written to cache entries for the first thread, the first thread:
resuming the hardware transaction without incurring a transaction abort; and
then completing the transaction, including committing buffered write data for one or more buffered cache entries in the first physical page.

4. The method of claim 1, wherein the first hardware thread performing a user to kernel mode transition being performed as the result of:
the operating system deciding to unmap the first virtual page which maps to the first physical page, the first physical page containing transactional memory hardware state created by the first thread, and as a result, the operating system removing the mapping of the first virtual page to the first physical page from the virtual memory page table and performing actions to reload virtual memory management hardware with an updated mapping for the first virtual page.

5. The method of claim 4, wherein the operating system that decides to unmap the first virtual page is running on a different thread than the first thread.

6. The method of claim 4, further comprising:
the operating system reestablishing the virtual memory mapping from the first virtual page to the first physical page and performing actions to reload virtual memory management hardware with an updated mapping for the first virtual page, and returning from the page fault to resume execution of the first thread.

7. The method of claim 1, further comprising while in kernel mode the transactional memory hardware continuing to monitor for conflicting memory accesses by other agents, and an access occurring which conflicts, thus setting an indicator, and further comprising upon returning to user mode, and as a result of the indicator being set, aborting the transaction.

* * * * *